United States Patent
Bielinski, Sr. et al.

(10) Patent No.: US 6,772,551 B1
(45) Date of Patent: Aug. 10, 2004

(54) HOOK SET AND ROD HOLDER

(76) Inventors: Richard D. J. Bielinski, Sr., 7349 S. Avenida Perlina, Tucson, AZ (US) 85746; William E. Waters, 1951 W. Calle Pacifica, Tucson, AZ (US) 85745

( * ) Notice: Subject to any disclaimer, the term of this patent is extended or adjusted under 35 U.S.C. 154(b) by 121 days.

(21) Appl. No.: 09/584,173

(22) Filed: May 25, 2000

Related U.S. Application Data

(60) Provisional application No. 60/135,940, filed on May 25, 1999.

(51) Int. Cl.[7] .............................................. A01K 97/11
(52) U.S. Cl. ......................................................... 43/15
(58) Field of Search ....................................... 43/15–17

(56) References Cited

U.S. PATENT DOCUMENTS

| | | | | |
|---|---|---|---|---|
| 975,822 A | * | 11/1910 | Becker et al. .................. | 43/16 |
| 1,996,704 A | * | 4/1935 | Hawkinson ..................... | 43/16 |
| 2,944,360 A | * | 7/1960 | Green ........................... | 43/16 |
| 2,964,868 A | * | 12/1960 | Bennett ......................... | 43/16 |
| 3,017,715 A | * | 1/1962 | Kennedy ........................ | 43/16 |
| 3,550,302 A | * | 12/1970 | Creviston et al. ............... | 43/16 |
| 4,391,059 A | * | 7/1983 | Cordova et al. ................ | 43/15 |
| 4,461,113 A | * | 7/1984 | Erwin ............................ | 43/15 |
| 4,471,553 A | * | 9/1984 | Copeland ....................... | 43/15 |
| 4,573,281 A | * | 3/1986 | Moisan ........................... | 43/17 |
| 4,676,018 A | * | 6/1987 | Kimball ......................... | 43/15 |
| 4,912,870 A | * | 4/1990 | Smoluk .......................... | 43/15 |
| 4,941,278 A | * | 7/1990 | Verkuil .......................... | 43/15 |
| 4,993,181 A | * | 2/1991 | Cooper .......................... | 43/15 |
| 5,245,778 A | * | 9/1993 | Gallegos et al. ............... | 43/15 |
| 5,279,064 A | * | 1/1994 | Jaeger ......................... | 43/21.2 |
| 5,345,708 A | * | 9/1994 | Loyd ........................... | 43/21.2 |
| 5,359,802 A | * | 11/1994 | Gutierrez ...................... | 43/16 |
| 5,383,298 A | * | 1/1995 | Engel ............................ | 43/15 |
| 5,524,376 A | * | 6/1996 | Flisak ........................... | 43/15 |
| 5,542,205 A | * | 8/1996 | Updike .......................... | 43/15 |
| 5,802,758 A | * | 9/1998 | Frehling ........................ | 43/15 |
| 5,855,542 A | * | 1/1999 | Wilks ............................ | 43/15 |
| 5,873,191 A | * | 2/1999 | Bova et al. .................... | 43/15 |
| 5,890,312 A | * | 4/1999 | Ball .............................. | 43/16 |
| 5,903,998 A | * | 5/1999 | Hawkins et al. ............... | 43/15 |

* cited by examiner

*Primary Examiner*—Darren W. Ark

(57) ABSTRACT

A fish-activated hook setting assembly for holding a strung fishing pole and automatically setting the hook when a fish strikes the bait affixed thereto. The device is rugged and simple to operate. The device allows the fisherman to cast his line in a normal fashion and thereafter reeve his baited fishing line into an anchoring slot and through a hook in the trigger mechanism and then rest the fishing pole on the device if desired. Upon a strike by a fish, the device in response to the thrust of a fish automatically releases a spring-biased setting arm which pulls the hook into the fish's jaw and secures the catch. The device is readily adaptable to lake fishing from the shore or a boat and to ice fishing.

4 Claims, 3 Drawing Sheets

HOOK SET AND ROD HOLDER

RELATED APPLICATIONS

This application relates to a provisional Application No. 60/135,940, filed May 25, 1999, by the same inventors.

INTRODUCTION

The present invention relates to fishing equipment, and more particularly to holders for fishing rods which provide a means for automatically setting the hook at the end of the fishing line when a fish strikes the bait.

BACKGROUND OF THE INVENTION

The need for device which can hold a fishing rod and which at the same time provides a means for automatically setting a fishing hook in the mouth of a fish when the fisherman is not in attendance is well known. Fishermen fishing from the shore of a lake or from a boat frequently use some type of holder for the fishing pole. In ice fishing, the fisherman almost universally will use a holder for the fishing pole. Therefore, devices to hold a fishing pole when the fisherman is not in attendance have been manufactured for years. In addition, some of the holders for fishing poles also provide a means for automatically setting the hook when a fish bites or takes the bait. Although the need for such a device is clearly known, the devices which are presently available have limitations which make them impractical for the holding of a fishing rod and the automatic setting of the fishing hook.

The following patents are examples of devices for holding a fishing rod while at the same time providing a means for setting the hook in the mouth of a fish while the fisherman is not in attendance:

U.S. Pat. No. 4,391,059 issued Jul. 5, 1983 (Cordova/Spitz)
U.S. Pat. No. 4,461,113 issued Jul. 24, 1984 (Erwin)
U.S. Pat. No. 4,471,553 issued Sep. 18, 1984 (Copeland)
U.S. Pat. No. 4,676,018 issued Jun. 30, 1987 (Kimball)
U.S. Pat. No. 4,993,181 issued Feb. 19, 1991 (Cooper)
U.S. Pat. No. 5,245,778 issued Sep. 21, 1993 (Gallegos)
U.S. Pat. No. 5,279,064 issued Jan. 18, 1994 (Jaeger)
U.S. Pat. No. 5 345,708 issued Sep. 13, 1994 (Loyd)
U.S. Pat. No. 5,359,802 issued Nov. 1, 1994 (Gutierrez)
U.S. Pat. No. 5,383,298 issued Jan. 24, 1995 (Engel)
U.S. Pat. No. 5,524,376 issued Jun. 11, 1996 (Flisak)
U.S. Pat. No. 5,542,205 issued Aug. 6, 1996 (Updike)
U.S. Pat. No. 5,802,758 issued Sep. 8, 1998 (Frehling)
U.S. Pat. No. 5,873,191 issued Feb. 23, 1999 (Bova et al.)
U.S. Pat. No. 5,890,312 issued Apr. 6, 1999 (Ball)

A major disadvantage of the devices disclosed by the above patents is that in each case the device relies upon movement of the entire fishing pole to create a pull on the fishing line in a direction away from the fish to set the hook in the mouth of the fish. In all of the devices except the Cooper device, the pull on the fishing line is accomplished by the action of a spring which rotates the entire fishing pole about an axis located at the handle region of the pole when a tug on the bait is detected. The device described in Cooper does not rely on a rotation of the fishing pole but instead relies upon the spring action of the fishing pole itself to pull the line and set the hook. However, in all of the devices described by the patents referenced above, the setting of the hook is accomplished when a latch mechanism maintaining the pole in a cocked or latched position is released by a tug on the fishing line exerted by a fish in contact with the bait. Additionally, all of the devices rely upon a large movement of the fishing pole to accomplish the small movement of the fishing line required to set the hook in the mouth of the fish. The forces involved in moving the fishing pole rapidly to set the hook are large compared to the force on the fishing line actually required to set the hook. The devices include a trip mechanism to maintain the spring action of such devices in a "cocked" position until a pull on the bait is sensed. Because of the forces involved, the sensitivity of such trip mechanisms to the contact of a fish with the bait is reduced. Further, since the action of setting the hook is accomplished by moving the fishing pole itself is instead of just the fishing line, inertia of the moving parts limits the speed of the hook setting action.

U.S. Pat. No. 5,855,542 issued to Wilks discloses a device which attaches to a fishing pole to automatically set the fishing hook. The device does not hold the fishing pole so an additional holder for the fishing pole is required. The fishing line must be unclamped and then clamped again each time the bait and hook is cast into the water. Adjustment of the sensitivity of the release for the hook setting mechanism is by attachable weights. In short this device is a complex combination of a number of parts which can easily come out of alignment during handling and transportation by the fisherman. Further, the device is not easy to adjust and use.

Accordingly, there exists a need for a simple device to hold a fishing pole which provides a means for automatically setting the fishing hook without the intervention of the fisherman which does not involve a movement of the fishing pole. The device should apply force directly to the fishing line to pull the fishing line away from a fish when the fish makes contact with the bait, thereby setting the hook in the mouth of the fish. The device should be rugged and hold the fishing pole in a rigid position for a variety of fishing applications. At the same time the device should provide simplicity of use and operation.

BRIEF SUMMARY OF THE INVENTION

The present invention relates generally to fishing devices which hold a fishing pole and automatically set the hook in the mouth of a fish when the fish strikes the bait and more particularly to a novel and unique device which rigidly supports the fishing pole when a fisherman is fishing from the shore of a lake, from a boat or dock or through a hole in the ice.

A primary object of the present invention is to provide a rugged and simple device which is easy for a fisherman to set up and operate.

Another object of the present invention is to provide for automatic operation, while at the same time allowing the fisherman to fish normally. The invention allows a fisherman to cast the bait normally and then rest the fishing pole in the device with a simple looping of the fishing line into the trigger mechanism when automatic setting of the fishhook is desired.

Another object of the present invention to allow the force required to trigger the device to be easily adjustable.

Still another object of the present invention is to provide simple accessories for the device so that the fisherman can use the device for a variety of fishing environments.

These and still further objects, as shall hereinafter appear, are readily fulfilled by the present invention in a remarkably unexpected fashion as will be readily discerned from the following detailed description of an exemplary embodiment thereof especially when read in conjunction with the accompanying drawings in which like parts bear like numerals throughout the several views.

DESCRIPTION OF THE PREFERRED EMBODIMENT

Figure 1:
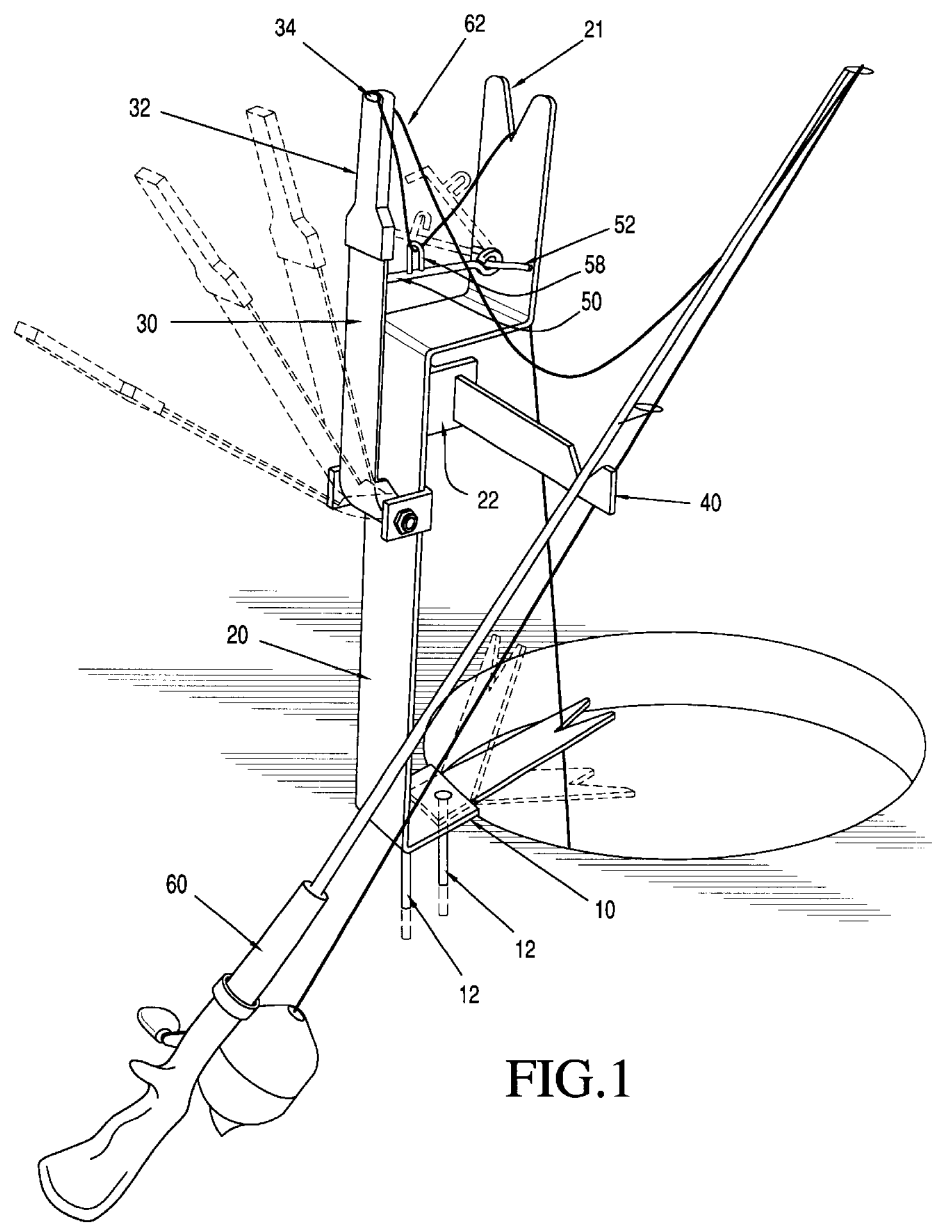
FIG. 1 is an isometric view of an automatic hook set and rod holder embodying the present invention when is it set up for ice fishing. Phantom lines show movement of the trigger and setting arm of the invention.
Figure 2:
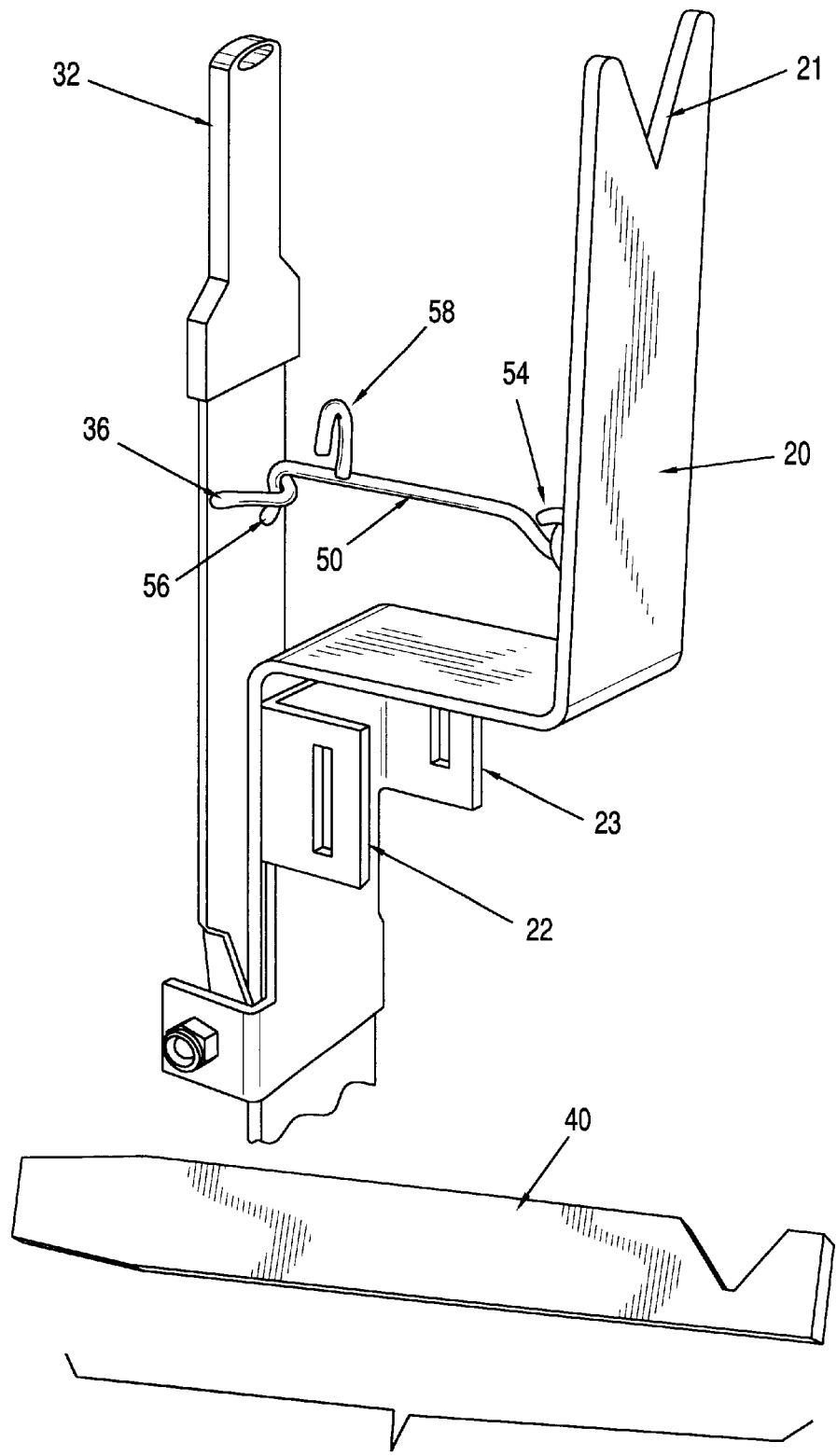
FIG. 2 is an isometric view of trigger and setting arm of the invention showing the trigger and setting arm in a latched or set position.
Figure 3:
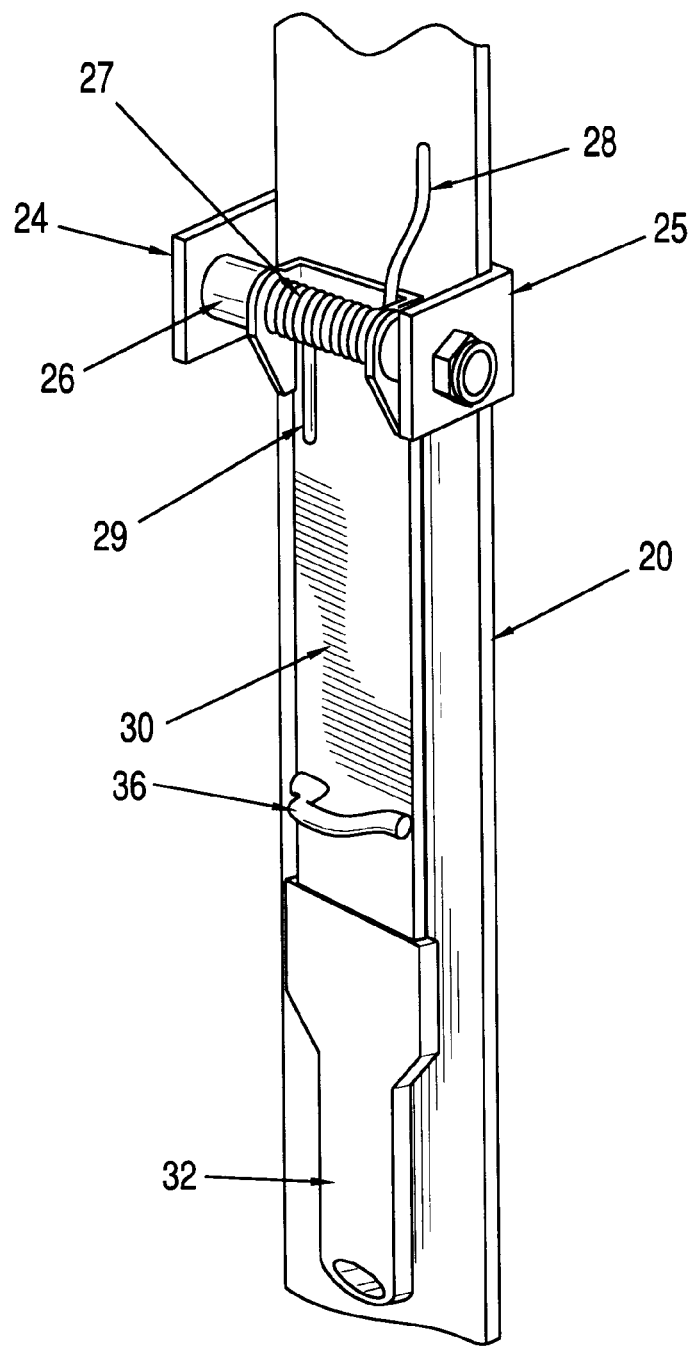
FIG. 3 is an isometric view of the setting arm of the invention showing the setting arm in a released position.

A brief description of the preferred embodiment of the present invention is set forth herein in sufficient detail to allow a person skilled in the art to understand the operation. Referring to FIG. 1, in the preferred embodiment of the invention a base 10 is provided with two sharpened rods 12 to anchor the device into the ground if fishing from the shore of a lake. The base 10 provides sufficient area that the fisherman can use his foot to press the two sharpened rods into the soil. The two sharpened rods 12 are placed into two holes drilled into the ice for ice fishing. These rods 12 can be fitted with an accessory clamp in such a way as to allow the base 10 to be clamped to rail of a boat when the fisherman is fishing from a boat. Attached to the base 10 is an upright structure 20 to which the various parts of the invention are attached. Attached to the upright structure 20 is a rod holder 40 for a fishing rod 60, the rod holder 40 is attached to the upright structure 20 by insertion into tabs 22 and 23. Tabs 22 and 23 are more clearly shown in FIG. 2. Referring to FIG. 3, Mounting tabs 24 and 25 and support rod 26 provide a mounting for the setting arm 30 of the invention and allow for rotational movement of the setting arm 30 around an axis defined by the center of the support rod 26. A spring 27 located concentrically around the support rod 26 and having ends 28 and 29 which engage the upright structure 20 and the setting arm 30 respectively supplies the rotational force for the setting arm 30. Referring to FIG. 1, a line holder 32 fabricated of a semi-flexible material is attached to the end of setting arm 30 at the end opposite to the attach point on upright structure 20. Line holder 32 contains a slot 34 into which a portion of the fishing line 62 is placed. Line holder 32 is preferably fabricated of neoprene but can also be fabricated of a number of resilient natural or synthetic rubbers which will allow a fishing line to be readily inserted into slot 34 while providing sufficient friction on a fishing line to secure the fishing line in slot 34 without slipping. Referring to FIG. 2, a trigger 50 rotates about attachment 52 located on upright structure 20 by a loop 54 formed in one end of trigger 50. A loop 36 is attached to the setting arm 30 into which the tip 56 of the trigger 50 is inserted in the latched set position for the invention. An open hook 58 attached to trigger 50 provides a trigger path for the fishing line 62. A V-groove 21 in upright structure 20 guides the fishing line into the trigger 50.

In using the invention, a fisherman first securely places the sharpened rods 12 into the soil of the shoreline in shore fishing or into holes in ice fishing in such a way that the base 10 is in close contact with the supporting medium. The upright structure 20 is adjusted to a nearly vertical orientation. The fisherman casts his line and bait into the water. The fishing line is then drawn through the V-groove 21 through open hook 58 and inserted into slot 34. Setting arm 30 is rotated against the pressure of spring 27 to a near vertical position. Tip 56 of the trigger 50 is inserted into loop 36 of the upright structure 20 to latch the invention. The placement of tip 56 within loop 36 determines the sensitivity of the trigger in a fashion similar to the trigger of a common mousetrap. The fishing pole 60 is then rested on rod holder 40. When a fish strikes the bait, it pulls the fishing line 62 which is held captive in slot 34, tightening fishing line 62 as it passes through open hook 58 and releasing tip 56 of trigger 50 from loop 36. This allows setting arm 30 to rotate under the force of spring 27 and at the same time pulls the fishing line 62 which is still engaged in slot 34 in a direction away from the fish. The movement of setting arm 30 and trigger 50 when the trigger 50 is released is shown by the phantom lines in FIG. 1. The pull on the fishing line supplied by the invention accomplishes a setting of the hook in the mouth of the fish with no intervention of the fisherman.

Further, it is readily apparent from the foregoing that a new and useful embodiment of the present invention has been herein described and illustrated which fulfills all of the aforestated objects in a remarkably unexpected fashion. It is of course understood that such modifications, alterations and adaptations as may readily occur to the artisan confronted with this disclosure are intended within the spirit of this disclosure which is limited only by the scope of the claims appended hereto.

What is claimed is:

1. A fish activated hook-setting assembly adapted for use with unattended fishing poles each having a baited fish line operatively associated therewith, said assembly comprising:

a base member mountable in ground, ice or to a boat;

a pole holding means attachable to said base and coactive therewith to support a fishing pole therein;

a spring biased setting arm having a body portion extending between a distal end and a proximal end, said distal end being pivotally secured to said base member and rotatable between an unloaded position and a loaded position, said setting arm further having narrow slot means defined in the proximal end thereof for receiving and securing a portion of said baited fish line therewith and loop means attached to said body portion to face said base portion when said setting arm is in its loaded position;

hook means pivotally attached to said base member and extending outwardly therefrom to engage said loop means of said setting arm and hold said setting arm in its loaded position;

first guide means extending upwardly from said hook means and adapted to engage said baited fish line from said slot means; and second guide means mounted on said base member for guiding said baited fish line from said first guide means into the water and maintain an angle of said baited line between said first and said second guide means whereupon in response to a fish striking the bait on the line, and creating a linear pull thereupon, the line, anchored by said slot means, creates an upward force upon said first guide means to disengage said hook means from said setting arm whereupon said setting arm in response to its spring-biased mounting, rapidly pivots from its loaded to its unloaded position and recoils a sufficient portion of said baited line to set the hook thereon to said fish.

2. A hook-setting assembly according to claim 1 in which said setting arm further comprises a sleeve portion, said body portion being pivotally secured to said base portion at its proximal end and said sleeve portion being disposed in circumscription about the distal end of said setting arm and having said slot-means defined therein, said sleeve portion being formed of sufficiently resilient material so that once a portion of said baited fish line is inserted therewith said fish line is immovable relative thereto.

3. A hook-setting assembly according to claim 2 in which said resilient material is selected from the group comprising natural and synthetic rubbers.

4. A hook-setting assembly according to claim 3 in which said resilient material is neoprene.

* * * * *